Patented Aug. 7, 1945

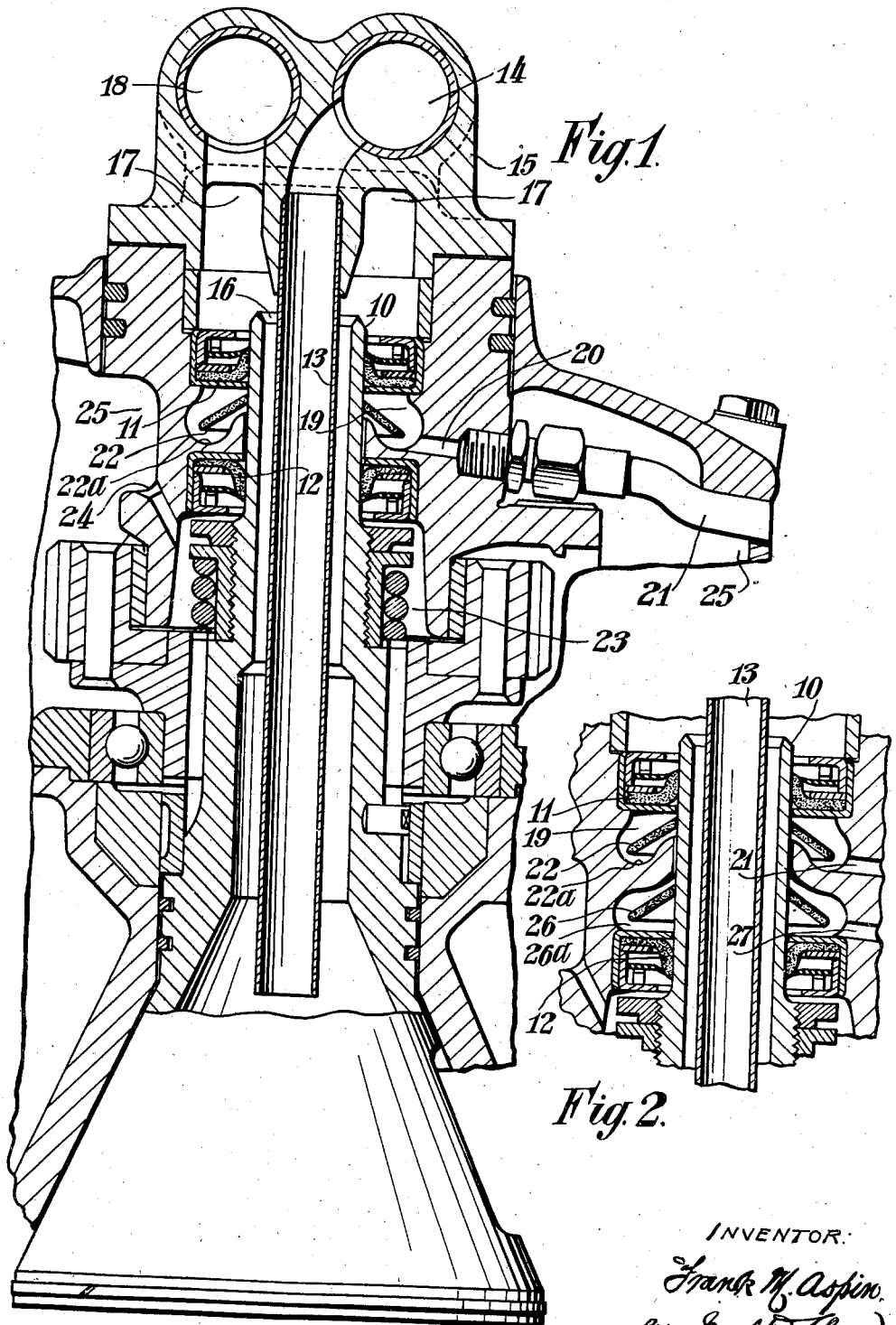

2,381,711

UNITED STATES PATENT OFFICE 2,381,711

ROTARY VALVE FOR INTERNAL-COMBUSTION ENGINES, COMPRESSORS, AND THE LIKE

Frank Metcalf Aspin, Bury, England

Application July 1, 1944, Serial No. 543,065
In Great Britain May 12, 1943

8 Claims. (Cl. 123—90)

This invention relates to rotary valves of internal combustion engines, compressors and the like of the kind in which the rotary valve member is adapted to be internally cooled by means of a cooling liquid.

Rotary valves of the kind above referred to and internal combustion engines or compressors having such rotary valves, are known for example from my earlier Patent No. 2,283,594 and patent application Serial No. 507,831, filed October 27, 1943, and the present invention is particularly, but not exclusively, applicable to such examples and types of rotary valves.

It is general in the cooling of rotary valve members to use, as a liquid coolant, the same lubricant as is used for the lubrication of the engine, either in a separate system, or actually supplied by the engine lubrication system, but other cooling liquids or vapours, offer certain advantages except that there is then the problem of effectively isolating the cooling system so that at least the lubricant fluid of the engine is not contaminated by the coolant and preferably also so that the coolant is not contaminated by the lubricant.

The object of the present invention is an improved construction providing for such relative isolation.

According to the invention individual sealing means are provided at the rotary valve member for the lubricant and coolant respectively, said sealing means being arranged to engage a part of the said rotary valve member and spaced apart to provide a neutral or escape zone adapted to release leakage from either, or both, of the sealing means.

In a preferred embodiment of the invention pressure differences are used to reduce leakage at the sealing means for the coolant.

In the accompanying drawing,

Fig. 1 is a sectional elevation showing the invention as applied to a rotary valve member of the kind described in the specifications of my earlier applications for patent.

Fig. 2 shows a modified construction.

As shown in Fig. 1, around the stem 10 of a rotary valve member adapted to work in an upright position as shown, are provided an upper sealing gland and a lower sealing gland embodying self-sealing gland packings 11 and 12 respectively and arranged relatively back-to-back. Depending into the rotary valve member is a coolant inlet tube 13 communicating with an inlet duct 14 in a head member 15, such tube 13 extending into the cooling space (not shown) of the head of the valve member. Around such tube 13, is the outlet space 16, from which rising coolant fluid collects in a space 17 before passing to an outlet duct 18 in the head 15. Between the gland packings 11 and 12 is a neutral or escape zone 19 from which is provided a drainage vent 20, connected by a pipe 21 with the atmosphere. On the valve stem is a conical rubber deflector ring 22 adapted to rotate freely in the space 19 with rotation of the valve member, and overhangs a channel 22a. The space 23 below the gland packing 12 communicates through a passage 24 with the space 25 around the valve stem occupied by the driving gearing (not shown) for the rotary valve, which space will also receive any lubricant for or from the bearing and sealing surfaces of the rotary valve member.

In operation, should any lubricant from the space 23 leak past the lower gland packing 12, it will pass by gravity or be thrown off on the underside of the deflector ring 22 into the neutral zone space 19 from whence it will pass by gravity to the passage 20 and by the pipe 21 through the space 25 to the atmosphere. Similarly, any leakage of coolant from the space 17 past the upper gland packing 11 will pass by gravity down, or be thrown off from the upper surface of the deflector ring 23 to escape to atmosphere along with any leakage as above described of lubricant.

The flow of coolant may be produced or assisted by induction applied to the outlet duct 18 in comparison with raised pressure at the inlet duct 14, so that, relative to the nautral zone 19, a slight sub-atmospheric pressure exists above the gland packing 11, when the machine is running, such pressure operating to reduce any leakage of the coolant past the gland packing 11 without at the same time introducing any risk that lubricant fluid can be drawn into the coolant system.

As shown in Fig. 2, the sealing means is constructed as shown in Fig. 1, with the difference that, in addition to the channel-like space 22a and deflector 22 and outlet 21 from such space there is provided a second channel-like space 26a and a deflector 26 with an outlet 27 from the channel-like space 26a. By this arrangement any leakage of the coolant past the gland packing 11 passes to the outlet 21 whilst any leakage of lubricant past the gland packing 12 passes into the space 26a and out through its separate outlet 27, so that the leakage coolant and lubricant may be separately collected.

The invention is not limited to all the details of the examples above described, for instance, different types of gland packing may be employed and other modification made without departing from the nature of the invention.

What I claim is:

1. Sealing means for an internally cooled rotary valve member of an internal combustion engine, compressor and the like, comprising individual sealing members for the lubricant and coolant respectively, arranged to engage a part of the said rotary valve member and spaced apart to provide a release or escape zone adapted to release leakage from either of the said sealing members.

2. Sealing means for an internally cooled rotary valve member of an internal combustion engine, compressor and the like comprising a sealing housing surrounding a part of the said rotary valve member, individual sealing members for the lubricant and coolant respectively, mounted in said housing and adapted to engage such part of the rotary valve member to prevent the passage of coolant and lubricant respectively, the said sealing members being spaced apart and the housing being formed with a space having a release or outlet and constituting a relief or escape zone adapted to release leakage from either of the said sealing members.

3. Sealing means or an internally cooled rotary valve member of an internal combustion engine, compressor and the like, comprising individual sealing members for the lubricant and coolant respectively, arranged to engage a part of the said rotary valve member and spaced apart to provide a release or escape zone adapted to release leakage from either of the said sealing members, said sealing members comprising self-sealing gland packings arranged relatively back-to-back.

4. Sealing means for an internally cooled rotary valve member of an internal combustion engine, compressor and the like, comprising a sealing housing surrounding a part of the said rotary valve member, individual self-sealing gland packings for the lubricant and coolant respectively, arranged back-to-back mounted in said housing and adapted to engage such part of the rotary valve member to prevent the passage of coolant and lubricant respectively, the said sealing members being spaced apart and the housing being formed with a space having a release or outlet and constituting a relief or escape zone adapted to release leakage from either of the said sealing members.

5. Sealing means for an internally cooled rotary valve member of an internal combustion engine, compressor and the like comprising individual sealing members for the lubricant and coolant respectively, arranged to engage a part of the said rotary valve member and spaced apart to provide a release or escape zone adapted to release leakage from either of the said sealing members and a deflector member secured to the rotary valve member and adapted to rotate therewith in the said relief or escape zone.

6. Sealing means for an internally cooled rotary valve member of an internal combustion engine, compressor and the like, comprising a sealing housing surrounding a part of the said rotary valve member, individual self-sealing gland packings for the lubricant and coolant respectively arranged back-to-back mounted in said housing and adapted to engage such part of the rotary valve member to prevent the passage of coolant and lubricant respectively, the said sealing members being spaced apart and the housing being formed with a space having a release or outlet and constituting a relief or escape zone adapted to release leakage from either of the said sealing members and a deflector member, secured to the rotary valve member and adapted to rotate therewith in the said relief or escape zone.

7. Sealing means for an internally cooled rotary valve member of an internal combustion engine, compressor and the like, in which the said rotary valve member has a substantially vertical axis of rotation comprising a sealing housing surrounding a part of the said rotary valve member, individual sealing members for the lubricant and coolant respectively, mounted in said housing and adapted to engage such part of the rotary valve member to prevent the passage of coolant and lubricant respectively, the said sealing members being spaced apart and the housing being formed with a space having a release or outlet and constituting a relief or escape zone adapted to release leakage from either of the said sealing members, and a conical deflector member secured to the rotary valve member so as to rotate therewith and overhang a channel-like formation in the said escape zone.

8. Sealing means for an internally cooled rotary valve member of an internal combustion engine, compressor and the like, in which the said rotary valve member has a substantially vertical axis of rotation comprising a sealing housing surrounding a part of the said rotary valve member, individual sealing member for the lubricant and coolant respectively, mounted in said housing and adapted to engage such part of the rotary valve member to prevent the passage of coolant and lubricant respectively, the said sealing members being spaced apart and the housing being formed with a space having a release or outlet and constituting a relief or escape zone adapted to release leakage from either of the said sealing members, and a conical deflector member secured to the rotary valve member so as to rotate therewith and overhang a channel-like formation in the said escape zone, said sealing members comprising self-sealing gland packings arranged relatively back to-back.

FRANK METCALF ASPIN.